United States Patent
Brunn et al.

(10) Patent No.: US 12,033,094 B2
(45) Date of Patent: Jul. 9, 2024

(54) AUTOMATIC GENERATION OF TASKS AND RETRAINING MACHINE LEARNING MODULES TO GENERATE TASKS BASED ON FEEDBACK FOR THE GENERATED TASKS

(71) Applicant: INTERNATIONAL BUSINESS MACHINES CORPORATION, Armonk, NY (US)

(72) Inventors: Jonathan F. Brunn, Logan, UT (US); Rachael Marie Huston Dickens, Raleigh, NC (US); Rui Zhang, San Francisco, CA (US); Ami Herrman Dewar, Durham, NC (US); Heiko H. Ludwig, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 529 days.

(21) Appl. No.: 16/574,064

(22) Filed: Sep. 17, 2019

(65) Prior Publication Data

US 2021/0081878 A1 Mar. 18, 2021

(51) Int. Cl.
*G06Q 10/10* (2023.01)
*G06N 20/00* (2019.01)
(Continued)

(52) U.S. Cl.
CPC ..... *G06Q 10/063112* (2013.01); *G06N 20/00* (2019.01); *G06Q 10/1095* (2013.01)

(58) Field of Classification Search
CPC .......... G06N 20/00; G06N 3/08; G06Q 10/10; G06Q 10/06311; G06Q 10/1095
See application file for complete search history.

(56) References Cited

U.S. PATENT DOCUMENTS

| | | |
|---|---|---|
| 7,953,806 B2 | 5/2011 | Lyle et al. |
| 8,146,104 B2 | 3/2012 | Chakra et al. |

(Continued)

OTHER PUBLICATIONS

"Entity linking", Wikipedia, pp. 4, [online][retrieved Sep. 12, 2019] https://en.wikipedia.org/wiki/Entity_linking.

(Continued)

*Primary Examiner* — Richard N Scheunemann
(74) *Attorney, Agent, or Firm* — KONRAD, RAYNES, DAVDA & VICTOR LLP; David W. Victor (57) ABSTRACT

Provided are a computer program product, system, and method for generation of tasks and retraining machine learning modules to generate tasks based on feedback for the generated tasks. A machine learning module processes an input text message sent in the communication channel to output task information including an intended action and a set of associated users. A task message is generated including the output task information of a task to perform. The task message is sent to a user interface panel in a user computer. Feedback is received from the user computer on the output task information in the task message. The machine learning module is retrained to output task information from the input text message based on the feedback to reinforce likelihood correct task information is outputted and reinforce lower likelihood incorrect task information is outputted.

17 Claims, 8 Drawing Sheets

(51) Int. Cl.
   *G06Q 10/0631* (2023.01)
   *G06Q 10/1093* (2023.01)

(56) References Cited

U.S. PATENT DOCUMENTS

| | | | |
|---|---|---|---|
| 8,671,008 | B2 | 3/2014 | Jones et al. |
| 9,170,993 | B2 | 10/2015 | Kalia et al. |
| 9,984,343 | B2 | 5/2018 | Shaouy |
| 9,986,092 | B1* | 5/2018 | Dirienzi ............... H04M 3/5232 |
| 2011/0314382 | A1* | 12/2011 | Sweeney ................ G06F 16/36 |
| | | | 715/738 |
| 2014/0006972 | A1 | 1/2014 | Celkonas |
| 2015/0215246 | A1 | 7/2015 | Lung et al. |
| 2018/0005111 | A1* | 1/2018 | Chaudhari ........... G06N 3/0481 |
| 2018/0083908 | A1* | 3/2018 | Dotan-Cohen ......... H04L 51/24 |
| 2018/0152407 | A1 | 5/2018 | Soni |
| 2019/0012302 | A1* | 1/2019 | MacMahon ....... G06F 17/30882 |
| 2019/0034420 | A1 | 1/2019 | Brunn et al. |
| 2019/0129749 | A1* | 5/2019 | White .................. G06Q 10/109 |
| 2020/0226418 | A1* | 7/2020 | Dorai-Raj ........... G06F 11/3447 |

OTHER PUBLICATIONS

"EVA", Voicea, pp. 3, [online][retrieved Sep. 12, 2019] https://www.voicea.com/.

S. Perez, "Google debuts a standalone to-do app", Google, pp. 2, [online][retrieved Aug. 6, 2019] https://techcrunch.com/2018/04/25/google-debuts-a-standalone-to-do-app-google-tasks/[Aug. 6, 2019 5:33:30 PM].

"IBM introduces Watson Workspace", ZDNet, pp. 11, [online][retrieved Aug. 6, 2019] https://www.zdnet.com/article/ibm-introduces-watson-workspace-collabo . . .

"Introducing Actions: A simple shortcut attached to every Slack message", pp. 5, [online][retrieved Aug. 6, 2019] https://medium.com/slack-developer-blog/introducing-actions-a-simple-s . . .

"Machine learning", Wikipedia, pp. 10, [online][retrieved Aug. 26, 2019] https://en.wikipedia.org/wiki/Machine_learning.

"Overcoming information overload with Watson", IBM Watson Workspace, pp. 6, [online][retrieved Aug. 6, 2019] https://medium.com/ibm-watson-workspace/overcoming-information-ov . . .

"Turn your Conversations into Knowledge", Reason8, pp. 8, [online][retrieved Aug. 6, 2019] https://reason8.ai/.

T. Wolf, "State-of-the-art neural coreference resolution for chatbots", pp. 12, [online][retrieved Aug. 8, 2019] https://medium.com/huggingface/state-of-the-art-neural-coreference-resolution-for-chatbots-33.

C. Newton, "Stride is a new Slack competitor from the makers of Hipchat", The Verge, pp. 5, [online][retrieved Aug. 6, 2019] https://www.theverge.com/2017/9/7/16264116/stride-hipchat-replacemen . . .

"Watson Discover Knowledge Graph", IBM Cloud Docs, pp. 15, [online][retrieved Aug. 6, 2019] https://cloud.ibm.com/docs/services/discovery?topic=discovery-kg#disambiguation.

"Focus on the meeting, forget the scribbling", Wrappup, pp. 5, [online][retrieved Aug. 6, 2019] http://www.wrappup.co/.

* cited by examiner

AUTOMATIC GENERATION OF TASKS AND RETRAINING MACHINE LEARNING MODULES TO GENERATE TASKS BASED ON FEEDBACK FOR THE GENERATED TASKS

BACKGROUND OF THE INVENTION

1. Field of the Invention

The present invention relates to a computer program product, system, and method for generation of tasks and retraining machine learning modules to generate tasks based on feedback for the generated tasks.

2. Description of the Related Art

Users may collaborate socially and at work through a collaborative messaging system in which users receive communications and messages from other users and send messages to others. Further, users of the collaborative messaging system may also create tasks or ToDo items based on their message conversations. Some programs allow a user to manually promote a message to a task or include the message in a task. Users may also see lists of actions and tasks in the environment to manually modify, reject or accept tasks created by others.

There is a need in the art for improved techniques for generating tasks in a collaborative messaging environment

SUMMARY

Provided are a computer program product, system, and method for generation of tasks and retraining machine learning modules to generate tasks based on feedback for the generated tasks. A machine learning module processes an input text message sent in the communication channel to output task information including an intended action and a set of associated users. A task message is generated including the output task information of a task to perform. The task message is sent to a user interface panel in a user computer. Feedback is received from the user computer on the output task information in the task message. The machine learning module is retrained to output task information from the input text message based on the feedback to reinforce likelihood correct task information is outputted and reinforce lower likelihood incorrect task information is outputted.

DETAILED DESCRIPTION

Described embodiments provide improvements to computer technology for automating the generation of task messages in a collaborative communication channel. A machine learning module processes an input text message sent in the communication channel to output task information including an intended action and a set of associated users, e.g., target user, beneficiary of the intended action, etc. The automatically generated task message includes the output task information of a task to perform and is sent to a user at a user computer. Users may provide feedback on the output task information for a task, such as whether the task is accepted, whether the task is dismissed as not a task, whether the task indicates wrong task information. This feedback information is used to retrain the machine learning module to reinforce a likelihood the machine learning module outputs correct task information and to reinforce a lower likelihood that incorrect task information is outputted.

Automatic task generation based on an input text stream reduces user workload in task management. This includes the cognitive load and actual time spent by users in manually creating (and assigning) tasks, e.g., ToDos, as well as time spent reading or re-reading a full transcript of conversation. Further automatic task generation reduces manual mistakes such as forgetting to create a tasks or erroneously assigning a ToDo.

Described embodiments also provide improved techniques for retraining the machine learning module by generating retrain information based on the feedback on the task messages. Described embodiments automatically convert feedback in task retrain information that may be automatically used to retrain the machine learning modules to increase the likelihood of producing correct task output information from the input text messages.

Figure 1:
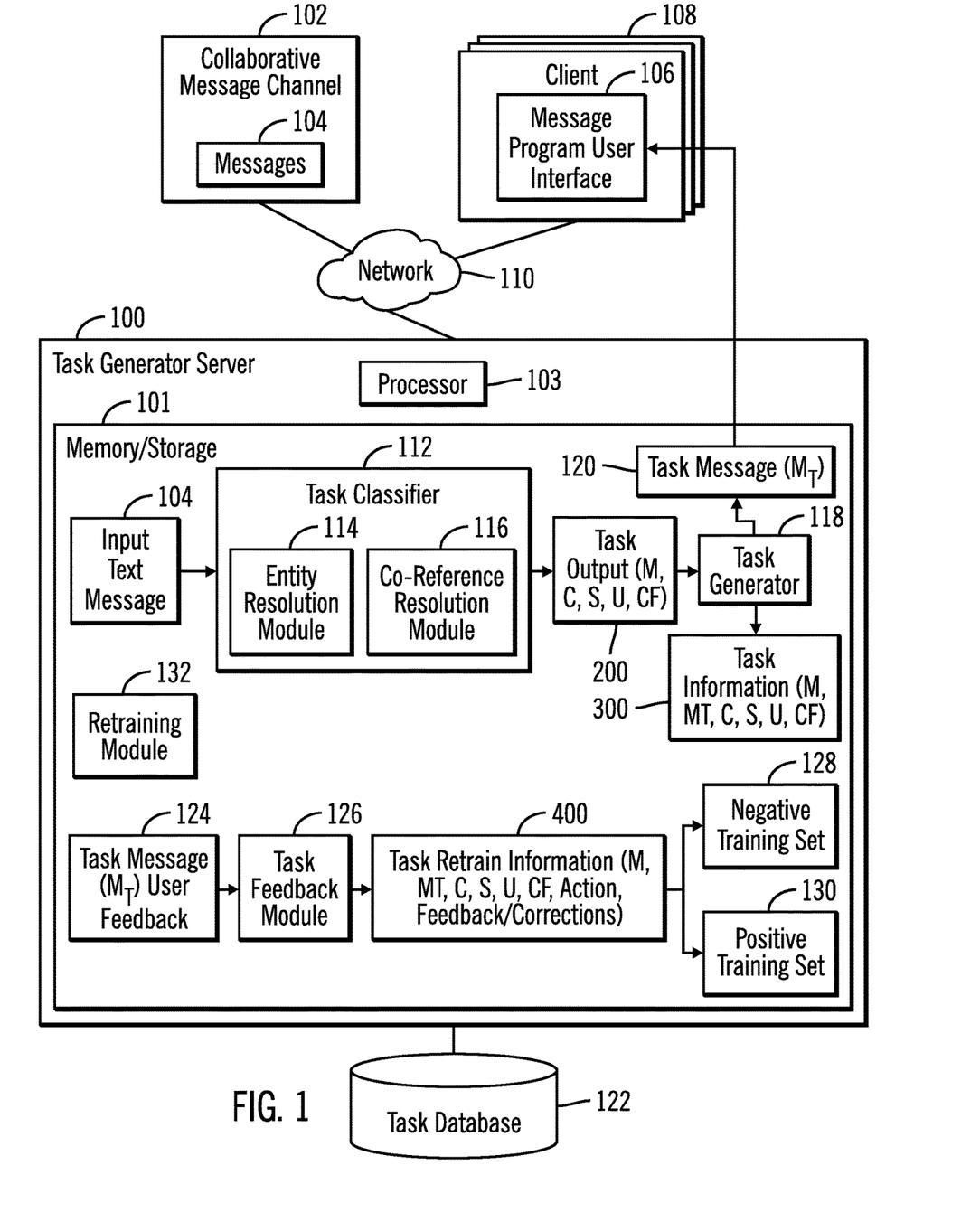
FIG. 1 illustrates an embodiment of a task generator server in a collaborative message environment.

FIG. 1 illustrates an embodiment of a task generator server 100 in which embodiments are implemented. The task generator server 100 includes a memory/storage 101 and a processor 103 or processor complex of one or more processor cores for executing programs in the memory 101. The task generator server 100 is coupled to a collaborative message channel 102, such as a chat group having numerous users generating messages 104. The messages 104 may be generated by a message program user interface 106 deployed at client computers 108 operated by the users of the collaborative message channel 102. The message program user interface 106 may generate text message or audio messages that are converted to text messages for processing by the task generator server 100. The task generator server 100, clients 108 and collaborative message channel 102 may communicate over a network 110.

The task generator server 100 may receive input text messages 104 generated by users in the collaborative message channel 102 to process to determine whether to generate a task, such as a ToDO task for users. Each new message may be passed on to the task generator server 100 or gathered and delivered in bulk The input text message 104 may be inputted into a task classifier 112 to apply natural language processing (NLP) algorithms to classify the input text message 104 as a task or other type of message and determine an intended action of the task, a reference or mention of a target user, and a beneficiary of the task. The task classifier 112 may include an entity resolution module 114 to determine an entity, such as a user or other type of entity, that maps to a reference to the target user in the input text message 104. The task classifier 112 may further include a co-reference resolution module 116 to resolve a referenced target user having multiple possible targets to a list of specific target users.

The co-reference resolution module 116 may find multiple references in input text, for instance, multiple noun phrases, which refer to the same real person, group, thing, or more generally noun, such as finding multiple references to a same person and determining whether these different references are referring to the same person. The text message 104 is inspected to see if the target reference comprises a specific name. Further, the target name may be inspected for special cases, such as "all", "any", "everyone", "y'all", "you guys" from a dictionary of nouns which can be used to reference multiple people. Similar dictionaries may be used to look up aliases for other groups. When such a reference is found, all users in the context to which the target reference maps, such as in the same collaborative message channel 102, same organization or workgroup, are added to the list of target users. All, any or other ambiguous group references may give preference to individuals who have recently communicated in a channel, including people who had participated in recent time or moments.

The entity resolution module 114 may map names and references from the co-reference resolution step to an entity type, and then search instances of that entity type by a specific name used. For instance, certain ambiguous reference words, which are known not to correspond to a particular person, are excluded from a search by using a dictionary of such word. In this way, a co-reference including "he" and "Jon" may only search for "Jon". The resolved entity type may be "person", in which case entity resolution module 114 may search for people with names matching the referenced target name. This process to resolve a list of ambiguous noun phrases to a concrete identification of a person or group may also be referred to as disambiguation. Named entity disambiguation, also referred to as named entity linking, named entity recognition and disambiguation, and named entity normalization, is the task of assigning a unique or specific identity in a target knowledge base to entities mentioned in the text.

This search of instances of an entity type by a specific name used may be contextual, and change relevance scoring based on the speaker and the context (space, channel, team, etc.) using techniques including as social graphs. The search for users mapping to the target reference may be contextual to the speaker of the action, and the original speaker of the user reference. In the case of a cross-sentence co-reference, these may be two distinct speakers. If no relevant targets or audiences are found, the action is added to an "unassigned" bucket, which may be explored by users (see display) especially in an "all actions" view. The resolved person or persons corresponding to the top or highest rated co-reference resolution are added to the list of target users for the action, and all other possible choices of resolved people are added to a list of "alternative targets".

Figure 2:
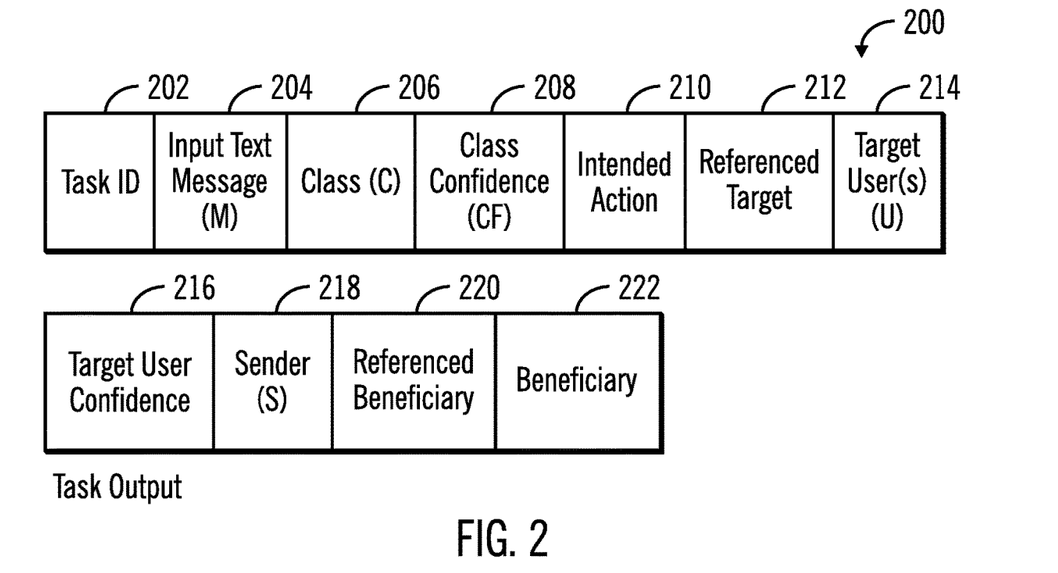
FIG. 2 illustrates an embodiment of task output generated by processing input text messages in the collaborative message environment.
Figure 3:
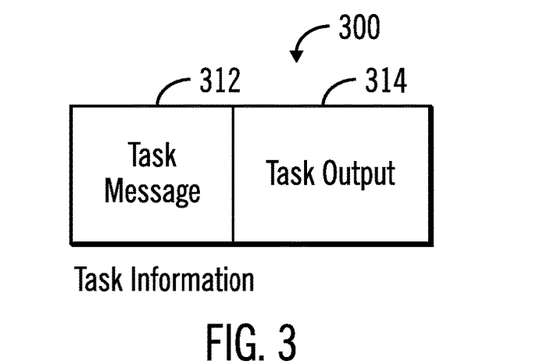
FIG. 3 illustrates an embodiment of task information having information on the task output and task message generated from the task output.

The task classifier 112 outputs task output 200 from the input text message including the task output information 200 that is provided to a task generator 118 that may rewrite the input message 104 into a task message 120 or to-do item, with the determined target users, intended action for target users, and a beneficiary of the task intended action. The task message ($M_T$) 120 may be sent to the sender computer 108 to render in the message program user interface 106 to allow the sender of the original input text message 104 to accept the task, dismiss/reject or provide changes to the target user(s), intended action, and/or beneficiary. The task generator 118 further generates task information 300 having the task output 200 and the generated task message 120 ($M_T$). The task information 300 may be stored in a task database 122 having information on generated tasks.

The task generator server 100 may receive task message user feedback 124 having information on whether the user receiving the task message 120, which may comprise the sender of the input text message 104 on which the task is based and/or the target users, accepted the task as a valid task for the input text message 104, dismissed the generated task, or provided corrections to any component of the task, such as target users, intended action, beneficiary, etc.

Figure 4:
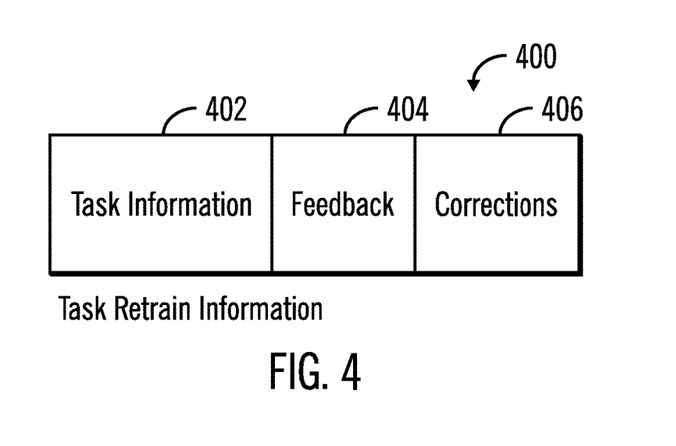
FIG. 4 illustrates an embodiment of task retrain information including positive and negative reinforcement to retrain machine learning modules producing the task output.

The task message user feedback 124 is provided to a task feedback module 126 that generates task retrain information 400 including the task information 300 and the sender feedback/corrections. The task feedback module 126 may add the task retrain information 400 to a negative training set 128 if the feedback indicates dismissal, modification or rejection of the task or task components, e.g., one or more of target users, intended action, beneficiary, etc. The task feedback module 126 may add the task retrain information 400 to a positive training set 130 if the feedback 124 indicates acceptance of the task and/or task components, e.g., one or more of target users, intended action, beneficiary, etc.

In certain situations, multiple users may provide feedback or take action on the same task which may be inconsistent with previous user feedback. In such case, when it comes time to actually use that feedback and convert to training data, there may be situations where one user's feedback overrides the conclusions of another user. For instance, if a user selects no secondary action for a task message, then the task feedback module 126 may assume the original task message was not a task. However, this assumption may be later corrected by another user assigning or completing the task action, causing the removal of this task from the negative training set 128 and adding to the positive training set 130. If, however, the user has selected an explicit "not a task" option, the item may remain in the negative training set 128. In other words, in certain embodiments, dismissing without a secondary action is taken to mean "not a task" unless another use takes some action on the task indicating the task "is a task". In this way, the classification of a task message 120 as a task or not a task may change over time.

The task classifier 112, entity resolution module 114, and co-reference resolution module 116 may implement a machine learning technique such as decision tree learning, association rule learning, neural network, inductive programming logic, support vector machines, Bayesian network, etc., to determine a task classification and task components, such as intended action, target user(s), and beneficiary. In further implementations, traditional information retrieval (search) technologies may be used in the final stage of the prediction, when resolving a name in context (e.g., "Jon") to a reference to a particular person.

The task generator server 100 may further include a retraining module 132 to retrain the machine learning modules 112, 114, 116 based on task retrain information 400 instances in the negative 128 and positive 130 training sets. In one embodiment, the machine learning modules 112, 114, 116 may comprise artificial neural network programs. Each neural network may be trained using backward propagation to adjust weights and biases at nodes in a hidden layer to produce the computed output, such as a task classification, target users, beneficiaries, etc., that are determined by processing an input text message 104. In backward propagation used to train a neural network machine learning module, biases at nodes in the hidden layer are adjusted accordingly to produce the desired outcome based on specified confidence levels. For instance, the machine learning modules 112, 114, 116 may be trained to produce a task classification, target users, beneficiaries with different confidence levels depending on user feedback as to whether the previous output from the modules 112, 114, 116 for task classification, target users, and beneficiaries was correct. Backward propagation may comprise an algorithm for supervised learning of artificial neural networks using gradient descent. Given an artificial neural network and an error function, the method may calculate the gradient of the error function with respect to the neural network's weights and biases.

FIG. 1 shows arrows to illustrate the program flow of processing and data among the program components 112, 118, 126 executing in the memory 101.

The machine learning algorithms 112, 114, 116 may comprise an ensemble of different machine learning models that are capable of processing input text 104 to determine outcomes 300 based on training of the machine learning algorithms 118 to produce specific results. The machine learning algorithms 118 may determine outcomes for input text 104 using different techniques such as decision tree learning, association rule learning, neural network, inductive programming logic, support vector machines, Bayesian network, etc.

The task generator server 100 may store program components, such as 112, 114, 116, 118, 116, 132, and data objects, such as 104, 200, 300, 124, 400, 128, 130 in a memory/storage 101, which may comprise one or more memory and/or storage devices known in the art, such as a solid state storage device (SSD) comprised of solid state electronics, NAND storage cells, EEPROM (Electrically Erasable Programmable Read-Only Memory), Dynamic Random Access Memory (DRAM), flash memory, flash disk, Random Access Memory (RAM) drive, storage-class memory (SCM), Phase Change Memory (PCM), resistive random access memory (RRAM), volatile and non-volatile Direct In-Line Memory Modules (DIMMs), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor. The memory/storage 101 thus may comprise a suitable volatile or non-volatile memory devices, including those described above.

Generally, program modules, such as the program components 106, 112, 114, 116, 118, 126, 132 may comprise routines, programs, objects, components, logic, data structures, and so on that perform particular tasks or implement particular abstract data types. The program components and hardware devices of the task generator server 100 of FIG. 1 may be implemented in one or more computer systems, where if they are implemented in multiple computer systems, then the computer systems may communicate over a network.

The program components 112, 114, 116, 118, 126, 132 may be accessed by the processor 103 from the memory 101 to execute. Alternatively, some or all of the program components 112, 114, 116, 118, 126, 132 may be implemented in separate hardware devices, such as Application Specific Integrated Circuit (ASIC) hardware devices.

The functions described as performed by the program 112, 114, 116, 118, 126, 132 may be implemented as program code in fewer program modules than shown or implemented as program code throughout a greater number of program modules than shown.

Although embodiments are described as classifying input text, in alternative embodiments the input may be provided in other media formats, such as audio, video, graphics, etc., and then converted to text to process as an input text message 104.

FIG. 2 illustrates an embodiment of an instance of task output 200 generated by the task classifier 112, and includes a task identifier (ID) 202 identifying a task being generated; the input text message (M) 204, such as input text message 104; a class (C) identified by the task classifier 112 by processing the message 204, such as indicating whether the input message 104 is a task or other type of item; a class confidence (CF) indicating a degree of confidence or confidence level in the determination of the class 206; an intended action 210 determined by performing natural language processing (NLP) of the text 204; a referenced target 212 to perform the action, may refer to one person or a group of persons, as determined by NLP of the text 204; the target user(s) (U) that the co-reference resolution module 116 and entity resolution module 114 map to the referenced target 212, such as by processing contextual information, user databases, etc.; a sender (S) 218 that generated the input text message 204; a referenced beneficiary 220 determined by using NLP processing of the text 204, which may be an optional beneficiary of the action; and the beneficiary(s) 222 that the entity resolution module 114 and co-reference resolution module 116 map to the referenced target 212.

FIG. 3 illustrates an embodiment of the task information 300 the task generator 118 generates to store in the task database 122, and includes a task message 302 generated by the task generator 118 using rewrite logic to generate a task comprising the independent action 210 for a set of associated users, such as, but not limited to, the target user(s) 214 to perform for a beneficiary 222; and task output 302, such as task output 200.

FIG. 4 illustrates an embodiment of task retrain information 400 generated by the task feedback module 126 in response to receiving user feedback 124 for a task message (M$_T$) and includes the task information 400, such as task information 300; feedback 404 from the sender on the task message 312 sent, where the feedback may indicate completion, dismissal or addition of the task (for manually added tasks; and corrections 406, if any, of certain components of the task, such as the target users 214, intended action, 210, and beneficiary 22. The task retrain information 400 is used by the retraining module 132 to retrain the task classifier 112, entity resolution module 114, and co-reference resolution module 116 based on the feedback 404/corrections 406.

For the feedback 404, tasks 120 may be dismissed by the sender if they are not an action, question or commitment, the co-reference resolution was wrong, disambiguation was wrong, the sender decides to ignore the message or the task is not important enough to track, and senders may accidently select the wrong feedback.

The feedback 404/corrections 406 provide for different types of retraining of the machine learning modules 112, 114, 116. The feedback 404/corrections 406 may provide positive and negative re-enforcement on actions, questions and commitment labeling for spans, taking the form of [text, label] tuples where negative re-enforcement may be considered positive re-enforcement on a null label, or more specific [text, label, boolean] tuples. In a further embodiment, the feedback 404/corrections 406 may provide and negative re-enforcement on co-reference resolution passage examples, taking the form of annotated passages of text where the annotations can be begin and end indexes of references and corresponding co-references in the passage [referenceStart, referenceEnd, co-referenceStart, co-referenceEnd]. Yet further, the feedback 404/corrections 406 may provide positive and negative re-enforcement on personalized named entity resolution, taking the form of [noun phrase, disambiguated person/UUID] tuples. A noun phrase may comprise a name of an entity or a phrase describing an entity. There may also be different ways to identify people, from emails, to government issued IDs, to randomly generated IDs in the system (like UUIDs), etc.

Feedback 404 comprising completion and dismissal are considered positive and negative re-enforcement on the identified span, adding a corresponding tuple. A completion action for a task, inserts a positive task retrain information 400 into the positive training set 130, labeled with the user who checked the item. Dismissal may insert a negative task retrain information 400, where dismissal may result in optional secondary actions.

Addition of task information in the corrections 406 adds the correction to task retrain information 400, including added target users. When a user dismisses an action, they may be doing so to manage their own work list. The user may dismiss an item not just because the item was incorrectly labeled as an action, but also because correctly labeled as an action, but incorrectly targeted. Described embodiments allow the senders or target users of the text message 104 to indicate to whom the item should be targeted as an optional secondary action when dismissing an item for a list. In one embodiment, the system displays "Suggest this as an action for . . . " with a drop down of likely choices based on the context for suggested targets. Further, as discussed, a dismissal of a task, followed by an assignment or action being completed by another individual user of the same task, would result in the task being positively reinforced. In this way, if one user takes an action affirming some part of the task, this positive reinforcement indicator may override previous ambiguous information suggesting the task was not a task, i.e., negative reinforcement indicator.

Figure 5:
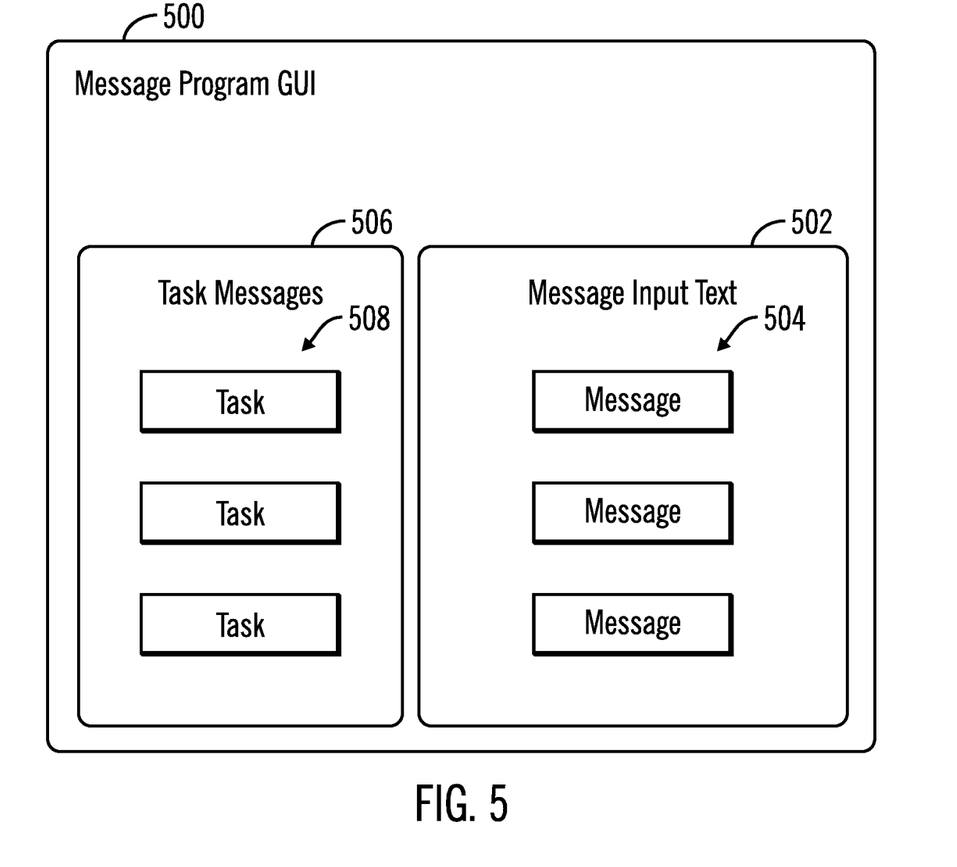
FIG. 5 illustrates an embodiment of a message program graphical user interface (GUI) in which generated input task messages from other users and the generated task messages are rendered and operated upon.

FIG. 5 illustrates an embodiment of a message program user interface 500, such as the message program user interface 106, and includes a message input text panel 502 displaying user messages 504 entered into the collaborative message channel 102 and a task messages panel 506 displaying tasks or ToDo messages 508, such as the task messages 120 generated by the task generator 118. The user may perform operations on the tasks 508 rendered in the task messages panel 506, such as dismiss, indicate complete, accept, or provide feedback and corrections on the automatically generated tasks 508.

Through the task messages panel 502, the user may open tasks for the sender in this space, complete tasks for the sender, open tasks for others/all, complete tasks for others, and manage unassigned tasks. In a further embodiment, clicking a task 504 in the task messages 502 may cause the display in the message input text 502 the message 504 on which the selected task 504 was generated to allow the user to determine the context in which the task was generated.

In a further embodiment, the task generator server 100 may include an additional action to sync or push a task, e.g., ToDO item, to another system. For instance, an individual may trigger the creation of a task in an external task management system. In this case, the creation of the task and potential assignments are taken as re-enforcement as if they were done in another system.

Figure 6:
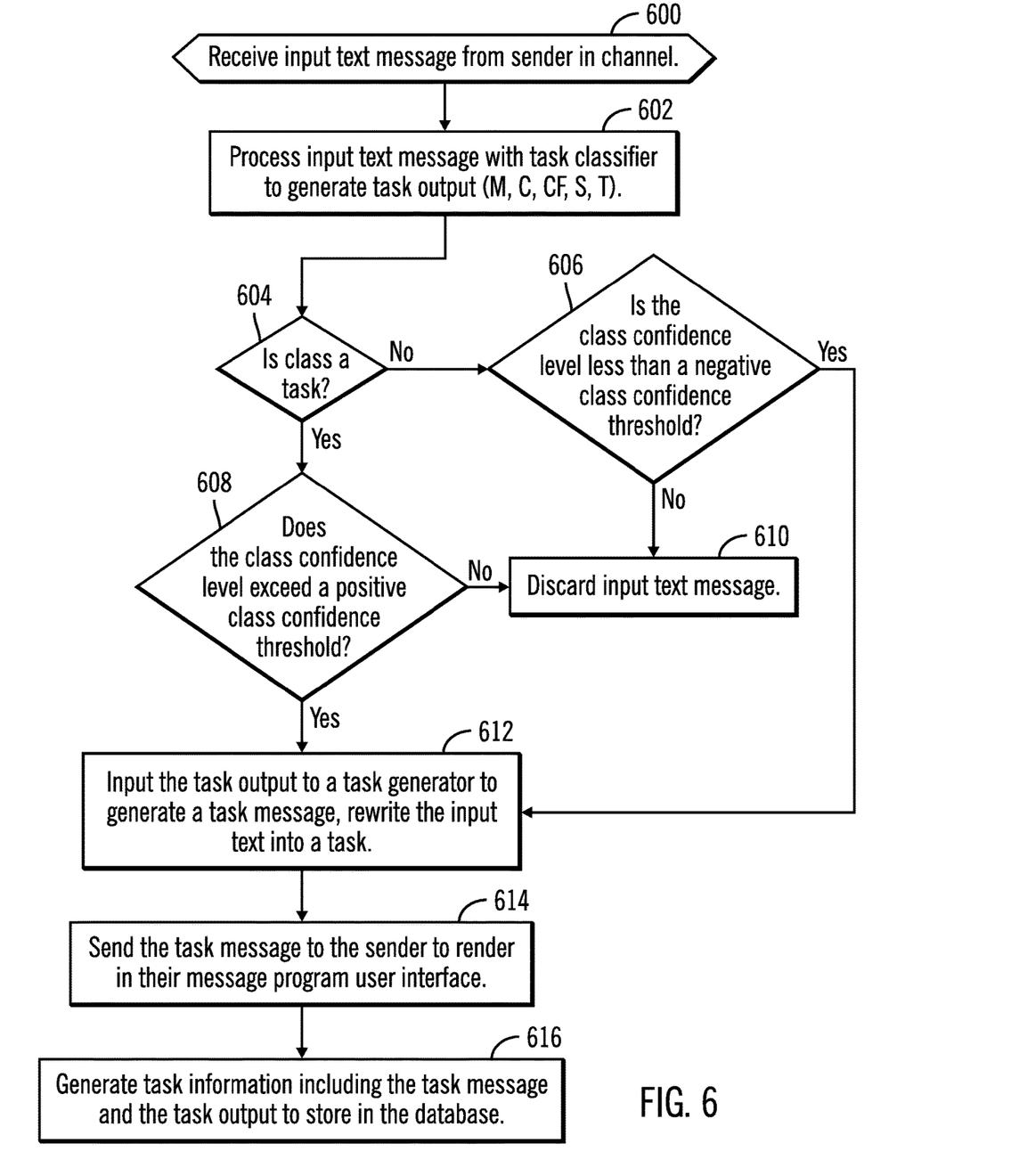
FIG. 6 illustrates an embodiment of operations to process an input text message and generate a task message.

FIG. 6 illustrates an embodiment of operations performed by the task classifier 112 to process an input text message 104 to determine task output 200. Upon receiving (at block 600) the input text message 104, the task classifier 112 processes the input text message 104 to generate the task output 200. The task classifier 112 may determine the class 206 by using NLP processing with a class confidence level 208, some percentage likelihood the classification is correct. The entity 114 and co-reference 116 resolution modules may determine one or more target users 214 for a referenced target 212. If (at block 604) the class 206 is a task and if (at block 608) the class confidence level 208 exceeds a positive class confidence threshold, then the task output 200 is inputted to the task generator 118 to generate a task message 120 by rewriting the input text 104 into a task with the target users, intended action and beneficiary. The task message 120 is sent (at block 614) to the sender of the input text message 204 to render in the message program user interface 106. The task generator 118 generates (at block 616) the task information 300 to store in the task database 122.

If (at block 608) the class confidence level does not exceed a positive class confidence threshold, e.g., some high percentage such as 80% or higher, then the input text message 104 is discarded (at block 610) and a task is not generated. If (at block 604) the class 206 does not indicate a task and if (at block 606) the confidence level of the classification 208 is less than a negative class confidence threshold, meaning that the determination the class 206 is not a task has low confidence, e.g., less than 60%, then control proceeds to block 612 to generate a task from the input message 104, because the likelihood of a false negative is high. If (at block 606) the class confidence level 208 does exceed the negative class confidence threshold, indicating the class has probably likely been classified as not a task, then control proceeds to block 610 to discard the input text message and not generate a task.

In an alternative embodiment, there may not be the check at block 606, because the screening of text 104 as not being a task is handled at the check at block 608 and the positive class threshold.

With the embodiment of FIG. 6, a task is generated from an input text message 104 to have target user(s), intended action, a beneficiary, and other information as shown task information 300. However, described embodiments consider a class confidence level 208 in the determination of the class 206 as a task that are compared with different positive and negative class confidence thresholds to determine whether to continue generating the task from the input text message 104 to increase the likelihood valid tasks are generated for consideration.

Figure 7:
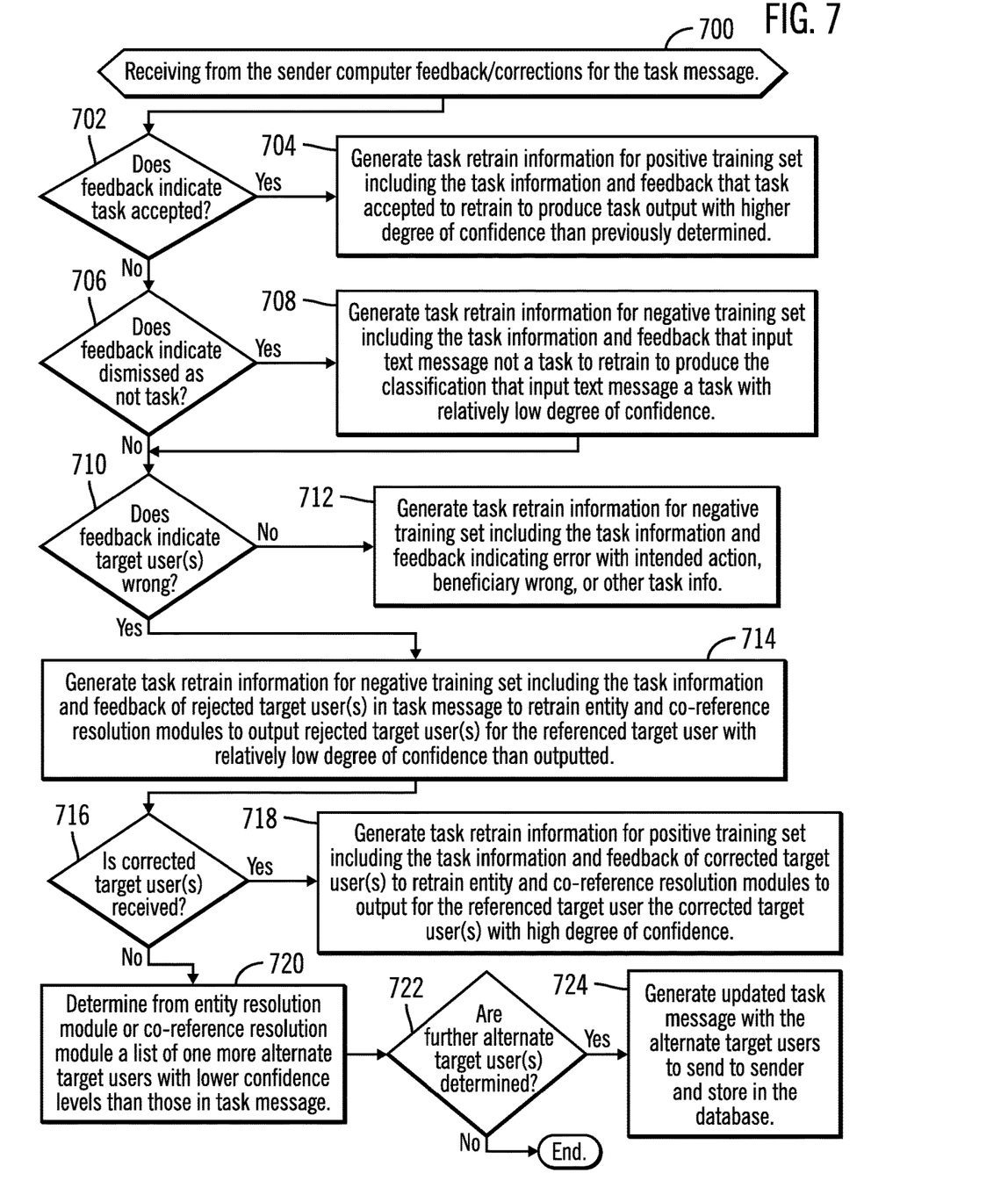
FIG. 7 illustrates an embodiment of operations to process received user feedback and/or corrections on generated task messages to generate task retrain information to retrain the machine learning models producing the task message based on the user feedback/corrections.

FIG. 7 illustrates an embodiment of operations performed by the task feedback module 126 to generate task retrain information 400 that is used to retrain the task classifier 112, entity resolution module 114, and co-reference resolution module 116 to improve task generation operations. The task feedback module 126 receives feedback and/or corrections 124 from a message program user interface 106 in which the sender of the input text message 104 receiving the task message 120 indicates acceptance, dismissal, rejection and/or corrections to task components, such as intended action, target users, and beneficiaries. Generated task retrain information 400 having the user feedback 404 and/or corrections 406 may be stored in the task database 122 for later retrieval and processing. Upon receiving (at block 700) the feedback/corrections 124, if (at block 702) the feedback 124 indicates that the task 120 was accepted or completed by the sender, then the task feedback module 126 generates (at block 704) task retrain information 400 for the positive training set 130 including the task information 300 in field 402 and feedback 404 that the task was accepted to retrain to produce the task output with higher degree of confidence than the previously determined class confidence 208.

If (at block 702) the task feedback 124 does not indicate the task was accepted and if (at block 706) the feedback 124 indicates the task 120 was dismissed as not a task, then the task feedback module 126 generates (at block 708) task retrain information 400 for the negative training set 128 including the task information 300 in field 402 and feedback 402 that the input text message 104 is not a task to retrain the text classifier 112 to produce the classification that input text message a task with lower degree of confidence than the previously determined class confidence 208.

If (at block 710) the feedback 124 indicates one or more of the target user(s) are wrong, then the task feedback module 126 generates (at block 712) task retrain information 400 for the negative training set 128 including the task information 300 in field 402 and feedback 402 indicating an error with the task output 200, such as error and/or correction for the intended action, beneficiary, etc. If (at block 710) one or more of the target users are indicated as having an error, then the task feedback module 126 generates (at block 714) task retrain information 400 for the negative training set 128 including the task information 300 and feedback 404 of rejected target user(s) in task message 120 to retrain the entity 114 and co-reference 116 resolution modules to output rejected target user(s) for the referenced target user with lower degree of confidence than the previously determined target user confidence 216. If (at block 716) the feedback 124 indicates corrected target user(s), then the task feedback module 126 generates (at block 718) task retrain information 40 for the positive training set 130 including the task information 300 and feedback of corrected target user(s) to retrain entity 114 and co-reference 116 resolution modules to output for the referenced target user 212 the corrected target user(s) 406 with a considered high degree of confidence, e.g., 80%+.

If (at block 716) no corrected target users are received, then the task feedback module 126 determines (at block 720) from the entity 114 resolution module or the co-reference resolution module 116 a list of one more alternate target users with lower confidence levels than those in the task output 200 used to form the task message 120. If (at block 722) there are further alternate target user(s) determined, then an updated task message is generated (at block 724). Updated task information 300 may also be generated with the updated task message 312 and new target users to store in the task database 122. If (at block 722) there are no further alternate target users determined, then control ends.

The operations of FIG. 7 process the message sender feedback 124 on a task message 120 that is generated to determine the errors in the generated task message that may then be used to retrain the machine learning modules of the task classifier 112, entity resolution module 114, and co-reference resolution module 116 to produce the errors with a relatively low confidence level and produce correct information in the message 120 and corrections with a relatively high confidence level to optimize the ability of the modules 112, 114, and 116 to generate correct task messages in a collaborative message channel environment.

Further, the embodiment of FIG. 6 provides for alternative targets or secondary choices which were discarded by the reference modules 114, 116 as lower probability in the co-reference resolution, step 1 of target resolution above, known as "alternative targets". For instance, if the original message was "Hi Jon! . . . oh, Rui—glad you are here too! Can you fill out the TPS report?" The system may have incorrectly added Jon as the target due to a failure in then co-reference resolution module. If the user selected in this stage corresponds to an alternative target, the alternative target's corresponding reference in the original text is added to a task retrain information 400 for the co-reference resolution module 116. Secondary choices or alternate target users may have been discarded due to lower relevance scores during resolution by the modules 114, 116. These choices correspond to people or entities which had lower scores when trying to resolve an ambiguous name such as "Jon" to a specific person through an entity or person search. If the user selected in this stage corresponds to an alternative target, or lower scoring target in the search stage, the social graph used to determine the relevance is reinforced for either or both of the current user doing the correct or the speaker(s) involved by adding task retrain information 400. If no alternative targets with lower confidence are available, task retrain information 400 may be populated based purely on a social graph search centered on the speaker or current user, and in all cases, the user may search for and select a user who is not in the suggested target users, and add task retrain information 400 to retrain the entity resolution module 114 to be more likely to resolve the reference to the correct target user.

In certain co-reference resolutions, there may be multiple "paths" to a single suggested target. For instance, a single name may resolve with different probabilities or scores to two different co-references in the original text. It is also possible, though not entirely likely, that an option in the suggested targets corresponds to both alternative co-reference resolutions and alternative search results. In this case the system may generate task retrain information 400 to reinforce on co-reference resolution passages and/or on name entity resolution, or neither.

Further embodiments may also present a tertiary option to resolve these ambiguities, optionally interacting with the user performing the correct with a presentation of visualization to the possible additions to task retrain information 400 to retrain the resolution modules 114, 116, For instance, the system may respond, "Thanks! Did you pick this because Rui was the "you" in "Can you fill out the TPS report?", while presenting this question with a visualization of the original passage. Correction of the target may only create retrain task information 400 for the resolution modules 114, 116.

Figure 8:
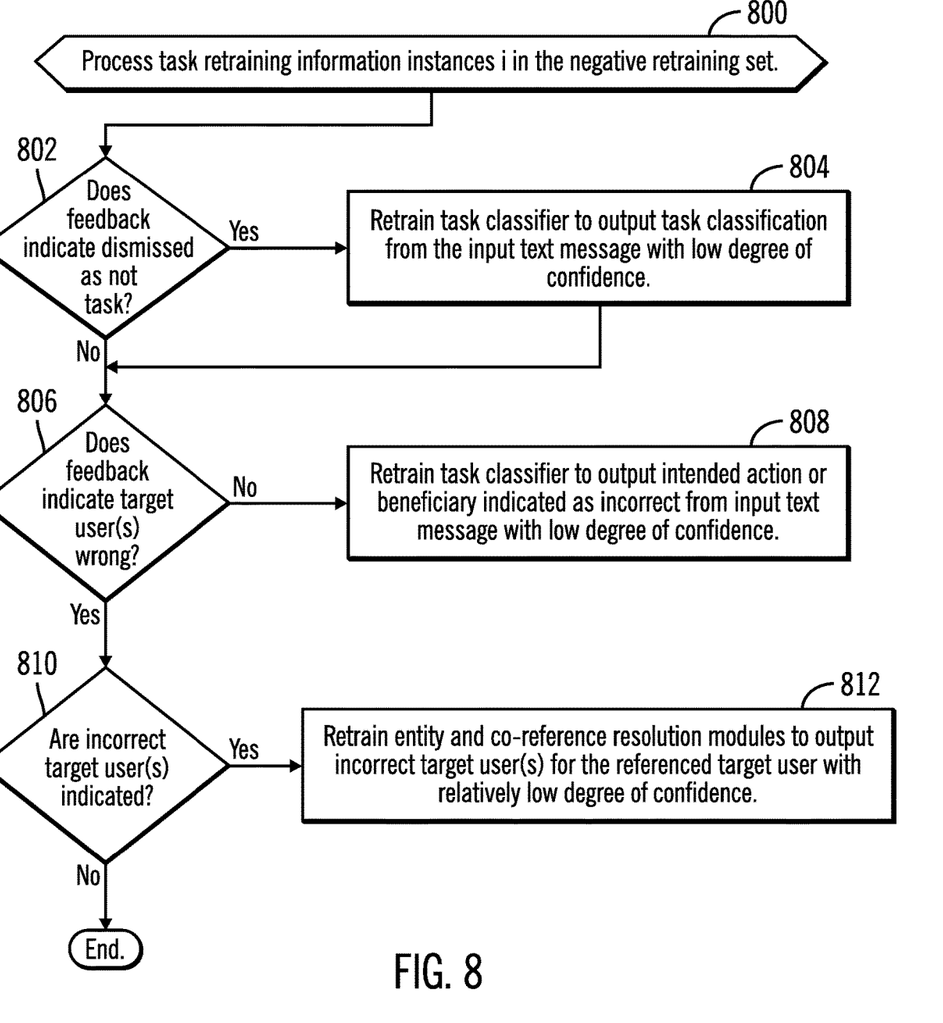
FIG. 8 illustrates an embodiment of operations to process task retrain information to retrain the machine learning modules from a negative retraining set to retrain machine learning modules to reduce likelihood of outputting incorrect information in task messages.

FIG. 8 illustrates an embodiment of operations performed by the retraining module 132 to retrain the task classifier 112, entity resolution module 114, and co-reference resolution module 116 based on the task retraining information 400 in the negative training set 128. Upon processing (at block 800) each of the task retraining information 400 instances in the negative training set 128, if (at block 802) the feedback 404 indicates the task message 120 was dismissed as not a task, then the retraining module 132 retrains (at block 804) the task classifier 112 to output a task classification from the input text message with a relatively low degree of confidence, such as a predetermined low degree of confidence, by adjusting biases at the nodes. From no branch of block 802 or block 804, if (at block 806) the feedback 404 indicates the target users are not wrong, and there are errors with other task information, such as intended action 210 or beneficiary 220, then the retraining module 132 retrains (at block 808) the task classifier 112 to output intended action or beneficiary indicated as wrong from input text message with the low degree of confidence. If (at block 806) the target users are wrong and if (at block 810) incorrect target users are indicated, then the retraining module 132 retrains (at block 812) the entity 114 and co-reference 116 resolution modules to output incorrect target user(s) for the referenced target user with relatively low degree of confidence than outputted.

Figure 9:
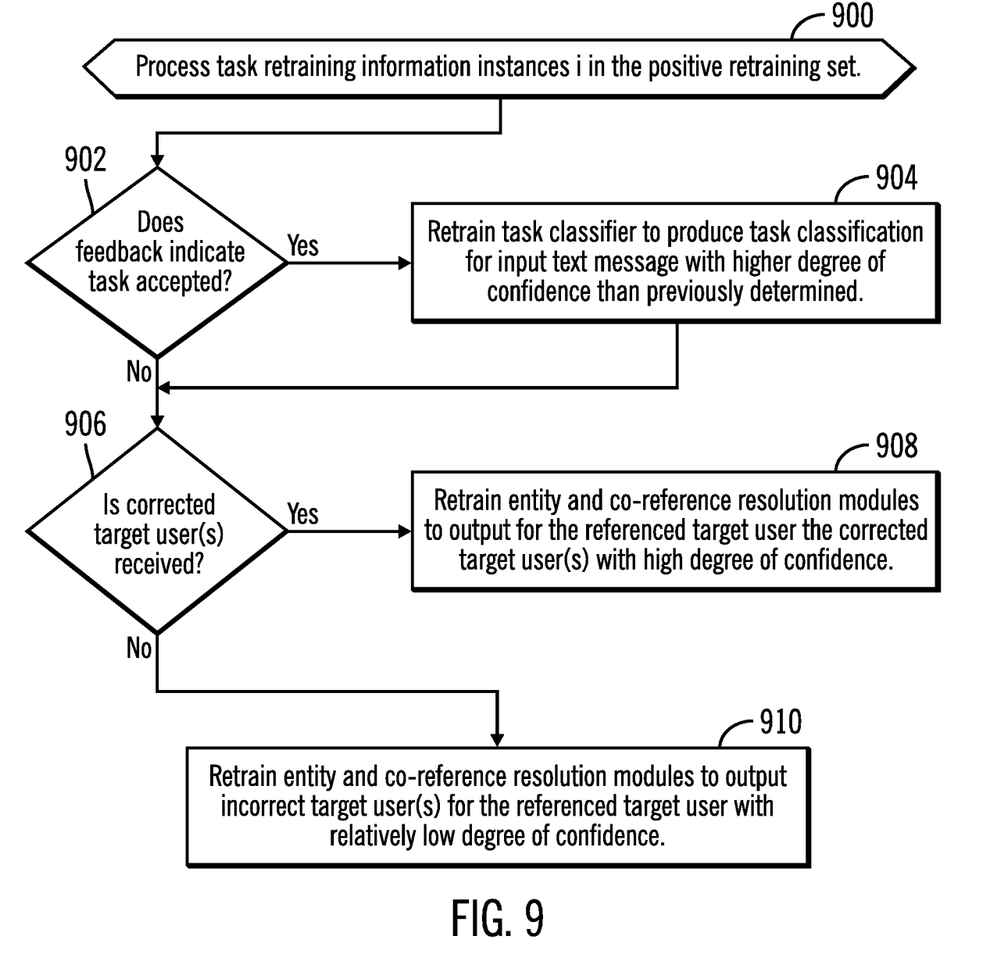
FIG. 9 illustrates an embodiment of operations to process task retrain information to retrain the machine learning modules from a positive retraining set to retrain d learning modules to increase likelihood of outputting correct information in task messages.

FIG. 9 illustrates an embodiment of operations performed by the retraining module 132 to retrain the task classifier 112, entity resolution module 114, and co-reference resolution module 116 based on the task retraining information 400 in the positive training set 130. Upon processing (at block 900) each of the task retraining information 400 instances in the positive training set 130, if (at block 902) the feedback 404 indicates the task message 120 was accepted as a task, then the retraining module 132 retrains (at block 904) the task classifier 112 to output from the input text 104 a task classification from the input text message with higher degree of confidence than the previously determined class confidence level 208 by adjusting biases at the nodes. From the no branch of block 902 or block 904, if (at block 906) the corrected target users 406 are indicated, then the retraining module 132 retrains (at block 908) the entity 114 and co-reference 116 resolution modules to output corrected target user(s) 406 for the referenced target user 212 with high degree of confidence. If (at block 906) no corrected target users are received, then the retraining module 132 retrains (at block 910) the entity 114 and co-reference 116 resolution modules to output the previously determined target user(s) 214 from the referenced target 212 with a higher degree of confidence than the target user confidence 216 previously calculated. If other information, such as intended action 210 and beneficiary 222 are indicated in feedback 404 as correct, then the task classifier 112 is retrained to output those components from the input text 104 with a higher degree of confidence to reinforce the previously made correct decisions.

With the described operations of FIGS. 8 and 9, the machine learning modules 112, 114, 116 used to classify and generate a task from an input text message 104 is trained to increase the confidence level or decrease the confidence level of task output based on feedback from the sender of the input text message 104. Described embodiments generate task retrain information 400 instances based on positive and negative feedback from senders of the input text 104, which is then processed by a retraining module to use to retrain the task generation machine learning modules 112, 114, 116.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
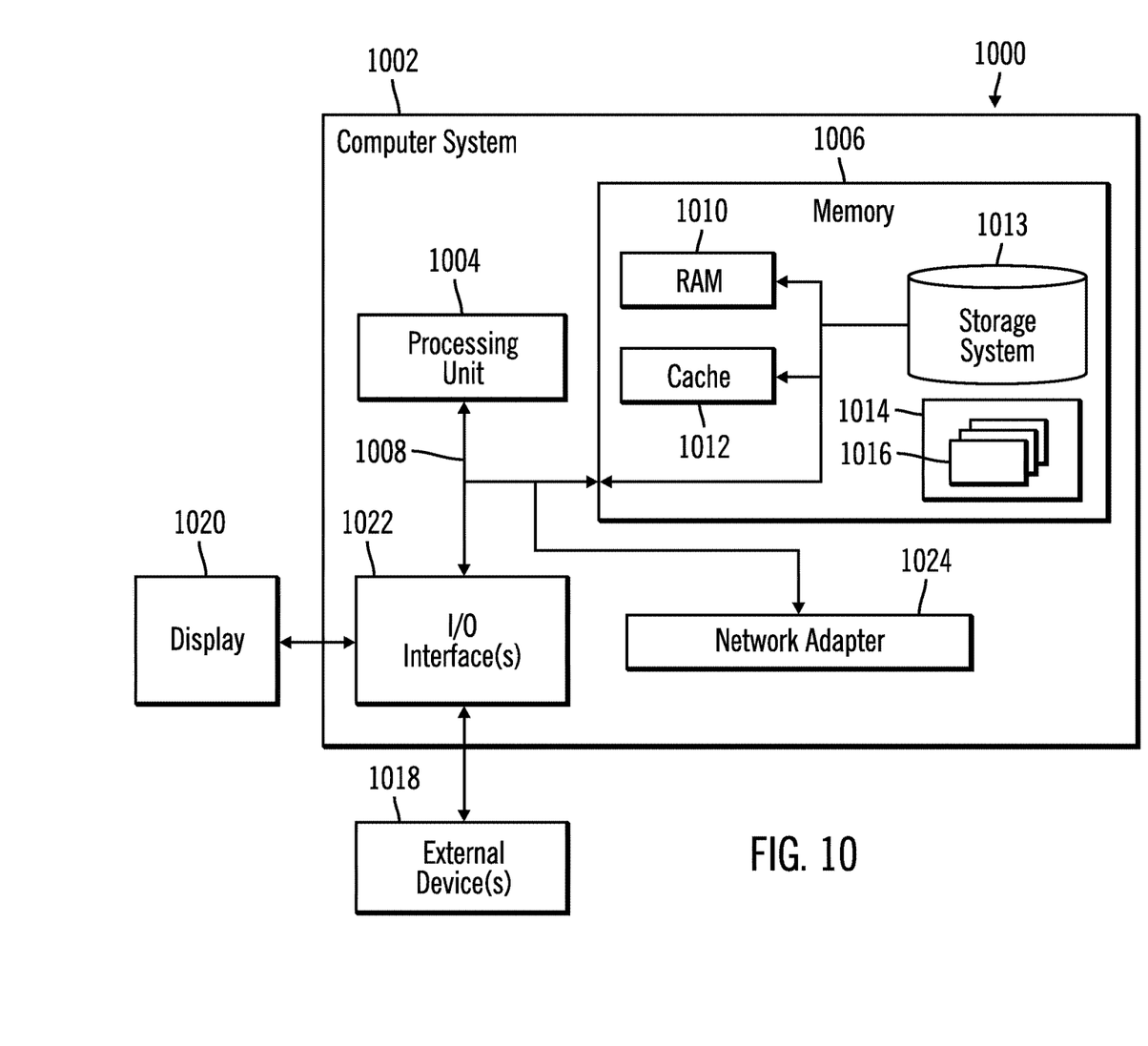
FIG. 10 illustrates a computing environment in which the components of FIG. 1 may be implemented

The computational components of FIG. 1, including the task generator server 100 and clients 108, may be implemented in one or more computer systems, such as the computer system 1002 shown in FIG. 10. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The systems of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating a task from an input text message in a communication channel, the computer program product comprising a computer readable storage medium having computer readable program code embodied therein that is executable to perform operations, the operations comprising:

processing, with a task classifier implementing machine learning, an input text message sent in the communication channel to output task information including the input text message, a class indicating whether the input text message is a task or other item, a class confidence level indicating a degree of confidence in the class, an intended action specified in the input text message, and a referenced target user to perform the intended action;

processing, with an entity resolution module implementing machine learning, the referenced target user indicated in the input text message to output a target user to perform the intended action and a target user confidence level indicating a degree of confidence with which the entity resolution module determines the target user from processing the referenced target user in the input text message;

generating a task message from the output task information and the target user to send in response to the class indicating the input text message is a task and the class confidence level exceeding a threshold;

retraining, using backward propagation, weights and biases at nodes of a neural network implemented in the task classifier, to produce the class indicated in the output task information for the input text message with a higher degree of confidence than the class confidence level in the output task information in response to feedback indicating the task message is accepted; and retraining, using backward propagation, weights and biases at nodes of a neural network implemented in the entity resolution module, to output the target user indicated in feedback as wrong with a lower degree of confidence than the target user confidence level in the output task information, wherein the retraining the task classifier and the entity resolution module optimizes the task classifier and entity resolution module to generate correct task messages acceptable to a user.

2. The computer program product of claim 1, wherein the operations further comprise:

receiving selection by a user to dismiss the task message;

adding the input text message and the task output information for the dismissed task message to a negative training set in response to the selection to dismiss the task message; and processing the input text message and the task output information in the negative training set to retrain the task classifier to produce the class indicated in the output task information for the input text message with a lower degree of confidence than the class confidence level.

3. The computer program product of claim 1, wherein the communication channel includes a plurality of users communicating text messages, wherein the operations further comprise:

using a co-reference resolution module to determine users in the communication channel corresponding to the referenced target user in the input text message;
generating a list of the determined users in the communication channel in a user interface panel of a receiving user in the communication channel;
receiving selection, from the generated list, of a selected target user by the receiving user to be the target user for the referenced target user; and
adding the input text message and the selected target user to a positive training set to train the entity resolution module to determine the selected target user for the referenced target user with a high degree of confidence.

4. The computer program product of claim 3, wherein the co-reference resolution module comprises a machine learning module, wherein the list of the determined users comprises a primary list of users in the communication channel determined for the referenced target user in the input text message with at least a minimum degree of confidence, wherein the operations further comprise:
receiving, from the receiving user, rejection of the primary list of users;
generating a secondary list of users in the communication channel that correspond to the referenced target user with less than a minimum degree of confidence;
receiving selection of a user from the secondary list of users to be the target user of the task message;
adding the input text message, the selected target user, and the intended action to a positive training set to train the co-reference resolution module to output the selected user from the secondary list of users with a high degree of confidence; and
training the co-reference resolution module to output the users in the primary list of users for the referenced target user in the input text message with a low degree of confidence.

5. The computer program product of claim 1, wherein the operations further comprise:
determining a name corresponding to the referenced target user in the input text message;
using an entity resolution module to map names in a user database to the determined name corresponding to the target user;
generating a list of the names in the user database that map to the target user in a user interface panel;
receiving selection of a name from the generated list to be the target user for the referenced target user; and
adding the input text message and the selected name to a positive training set to train the task classifier to output the selected name for the referenced target user with a high degree of confidence.

6. The computer program product of claim 1, wherein the processing the input text message further comprises:
determining the class and the class confidence level for the class from the input text message;
determining whether the class comprises a task;
determining whether the class confidence level exceeds a positive confidence threshold; and
inputting the input text message and the output task information to rewrite logic to generate the task message to display in a user interface panel.

7. The computer program product of claim 6, wherein the operations further comprise:
determining whether the class confidence level is less than a negative confidence threshold in response to determining that the class does not comprise a task; and
inputting the input text message and the target user to rewrite logic to generate the task message to display in the user interface panel.

8. The computer program product of claim 7, wherein the output from the entity resolution module further includes a beneficiary of the intended action, wherein the operations further comprise:
adding the target user, intended action, and the beneficiary, the input text message, and the task message to a database; and
retraining the task classifier to output a task class for the input text message with a lower confidence level than previously determined for the input text message in response to a dismissal of the task message in the database.

9. A system for generating a task from an input text message in a communication channel, comprising:
a processor; and
a computer readable storage medium having computer readable program code embodied therein that when executed by the processor performs operations, the operations comprising:
processing, with a task classifier implementing machine learning, an input text message sent in the communication channel to output task information including the input text message, a class indicating whether the input text message is a task or other item, a class confidence level indicating a degree of confidence in the class, an intended action specified in the input text message, and a referenced target user to perform the intended action;
processing, with an entity resolution module implementing machine learning, the referenced target user indicated in the input text message to output a target user to perform the intended action and a target user confidence level indicating a degree of confidence with which the entity resolution module determines the target user from processing the referenced target user in the input text message;
generating a task message from the output task information and the target user to send in response to the class indicating the input text message is a task and the class confidence level exceeding a threshold;
retraining, using backward propagation, weights and biases at nodes of a neural network implemented in the task classifier, to produce the class indicated in the output task information for the input text message with a higher degree of confidence than the class confidence level in the output task information in response to feedback indicating the task message is accepted; and
retraining, using backward propagation, weights and biases at nodes of a neural network implemented in the entity resolution module, to output the target user indicated in feedback as wrong with a lower degree of confidence than the target user confidence level in the output task information, wherein the retraining the task classifier and the entity resolution module optimizes the task classifier and entity resolution module to generate correct task messages acceptable to a user.

10. The system of claim 9, wherein the operations further comprise:
- receiving selection by a user to dismiss the task message;
- adding the input text message and the task output information for the dismissed task message to a negative training set in response to the selection to dismiss the task message; and
- processing the input text message and the task output information in the negative training set to retrain the task classifier to produce the class indicated in the output task information for the input text message with a lower degree of confidence than the class confidence level.

11. The system of claim 9, wherein the communication channel includes a plurality of users communicating text messages, wherein the operations further comprise:
- using a co-reference resolution module to determine users in the communication channel corresponding to the referenced target user in the input text message;
- generating a list of the determined users in the communication channel in a user interface panel of a receiving user in the communication channel;
- receiving selection, from the generated list, of a selected target user by the receiving user to be the target user for the referenced target user; and
- adding the input text message and the selected target user to a positive training set to train the entity resolution module to determine the selected target user for the referenced target user with a high degree of confidence.

12. The system of claim 9, wherein the operations further comprise:
- determining a name corresponding to the referenced target user in the input text message;
- using an entity resolution module to map names in a user database to the determined name corresponding to the target user;
- generating a list of the names in the user database that map to the target user in a user interface panel;
- receiving selection of a name from the generated list to be the target user for the referenced target user; and
- adding the input text message and the selected name to a positive training set to train the task classifier to output the selected name for the referenced target user with a high degree of confidence.

13. The system of claim 9, wherein the processing the input text message further comprises:
- determining the class and the class confidence level for the class from the input text message;
- determining whether the class comprises a task;
- determining whether the class confidence level exceeds a positive confidence threshold; and
- inputting the input text message and the output task information to rewrite logic to generate the task message to display in a user interface panel.

14. A method for generating a task from an input text message in a communication channel, comprising:
- processing, with a task classifier implementing machine learning, an input text message sent in the communication channel to output task information including the input text message, a class indicating whether the input text message is a task or other item, a class confidence level indicating a degree of confidence in the class, an intended action specified in the input text message, and a referenced target user to perform the intended action;
- processing, with an entity resolution module implementing machine learning, the referenced target user indicated in the input text message to output a target user to perform the intended action and a target user confidence level indicating a degree of confidence with which the entity resolution module determines the target user from processing a referenced target user in the input text message;
- generating a task message from the output task information and the target user to send in response to the class indicating the input text message is a task and the class confidence level exceeding a threshold;
- retraining, using backward propagation, weights and biases at nodes of a neural network implemented in the task classifier, to produce the class indicated in the output task information for the input text message with a higher degree of confidence than the class confidence level in the output task information in response to feedback indicating the task message is accepted; and
- retraining, using backward propagation, weights and biases at nodes of a neural network implemented in the entity resolution module, to output the target user indicated in feedback as wrong with a lower degree of confidence than the target user confidence level in the output task information, wherein the retraining the task classifier and the entity resolution module optimizes the task classifier and entity resolution module to generate correct task messages acceptable to a user.

15. The method of claim 14, further comprising:
receiving selection by a user to dismiss the task message;
- adding the input text message and the task output information for the dismissed task message to a negative training set in response to the selection to dismiss the task message; and
- processing the input text message and the task output information in the negative training set to retrain the task classifier to produce the class indicated in the output task information for the input text message with a lower degree of confidence than the class confidence level.

16. The method of claim 14, wherein the communication channel includes a plurality of users communicating text messages, further comprising:
- using a co-reference resolution module to determine users in the communication channel corresponding to the referenced target user in the input text message;
- generating a list of the determined users in the communication channel in a user interface panel of a receiving user in the communication channel;
- receiving selection, from the generated list, of a selected target user by the receiving user to be the target user for the referenced target user; and
- adding the input text message and the selected target user to a positive training set to train the entity resolution module to determine the selected target user for the referenced target user with a high degree of confidence.

17. The method of claim 14, wherein the processing the input text message further comprises:
- determining the class and the class confidence level for the class from the input text message;
- determining whether the class comprises a task;
- determining whether the class confidence level exceeds a positive confidence threshold; and
- inputting the input text message and the output task information to rewrite logic to generate the task message to display in a user interface panel.

* * * * *